US006462939B1

(12) United States Patent
Heirich

(10) Patent No.: US 6,462,939 B1
(45) Date of Patent: Oct. 8, 2002

(54) BEZEL MOUNT APPARATUS AND METHOD

(75) Inventor: Douglas L. Heirich, Palo Alto, CA (US)

(73) Assignee: Apple Computer, Inc., Cupertino, CA (US)

( * ) Notice: Subject to any disclaimer, the term of this patent is extended or adjusted under 35 U.S.C. 154(b) by 0 days.

(21) Appl. No.: 09/476,405

(22) Filed: Dec. 30, 1999

(51) Int. Cl.[7] .................................................. H05K 7/14
(52) U.S. Cl. ....................... 361/682; 361/681; 361/683; 361/679; 248/917-920
(58) Field of Search .............................. 361/679, 681, 361/682, 683; 248/917–924; 220/4.02; 312/7.2; D14/106, 113

(56) References Cited

U.S. PATENT DOCUMENTS

| 5,661,630 A | * | 8/1997 | Levins et al. ................ 361/683 |
| 5,806,940 A | * | 9/1998 | Heirich ........................ 312/7.2 |
| 5,863,106 A | * | 1/1999 | Beak ............................ 312/7.2 |
| 6,068,227 A | * | 5/2000 | Morgan et al. ........... 248/278.1 |
| 6,104,444 A | * | 8/2000 | Han et al. .................... 348/836 |
| 6,157,423 A | * | 12/2000 | Stonebraker et al. ......... 349/58 |

* cited by examiner

*Primary Examiner*—Darren Schuberg
*Assistant Examiner*—David Foster
(74) *Attorney, Agent, or Firm*—Henneman & Saunders; Larry E. Henneman, Jr.

(57) ABSTRACT

A computer monitor case (10) having a case front (16) to which is affixed a bezel (20) using a plurality of intermediate attachment devices (28). The attachment device (28) is affixed to the bezel (20) by inserting projections (42) of the attachment device (28) within associated irregular apertures (38) in bezel attachment tabs (24) on the bezel (20). The attachment device (28) is, in turn, affixed to a case front (16) using case attachment tabs (26) and screws (30). Accordingly, the computer monitor case (10) is constructed such that moldings for affixing the bezel (20) to the case (10) are not readily visible through the transparent case (10).

24 Claims, 4 Drawing Sheets

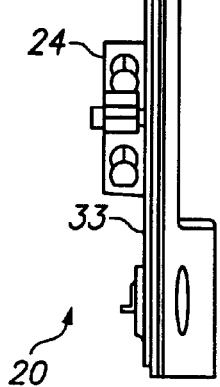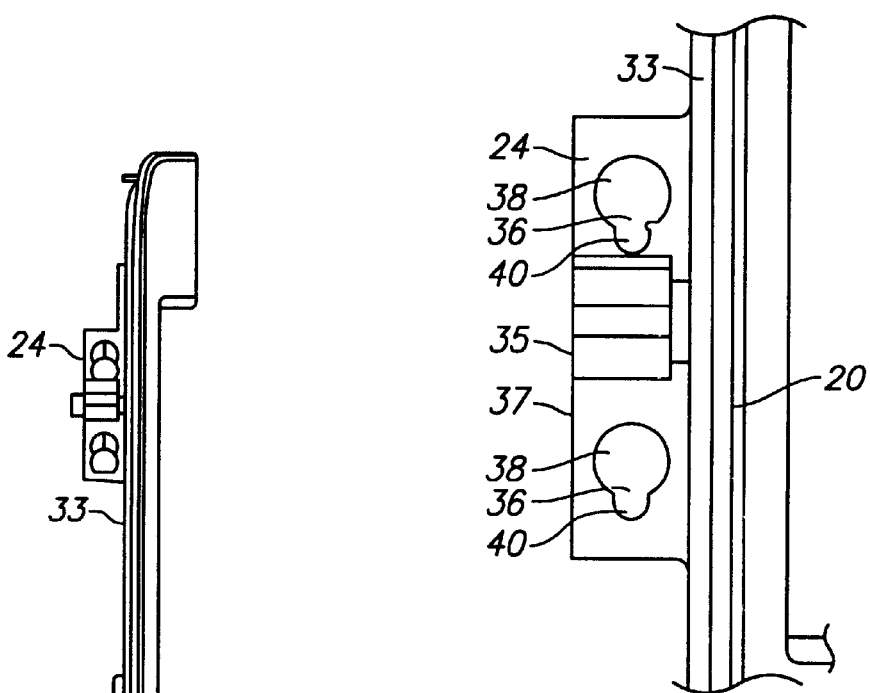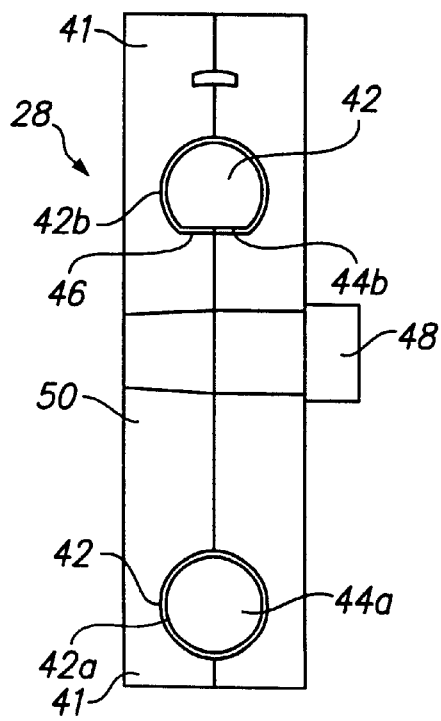
FIG. 5
FIG. 6
FIG. 7

BEZEL MOUNT APPARATUS AND METHOD

A portion of the disclosure of the patent document contains material which is subject to copyright protection. The owner has no objection to the facsimile reproduction by any one of the patent disclosure, as it appears in the Patent and Trademark Office patent files of records of any country, but otherwise reserves all rights whatsoever.

TECHNICAL FIELD

The present invention relates to the field of mechanical construction, and more particularly to an improved attachment apparatus and method for affixing a portion of a housing shell to the remainder thereof. The predominant current usage of the present inventive bezel mount apparatus and method is in the attachment of a front bezel to a computer monitor housing, wherein it is desirable to have an attractive connection without sacrificing mechanical integrity and strength.

BACKGROUND ART

A monitor bezel is generally the portion of the monitor housing which surrounds the viewing screen and is visible from the front of the monitor as the user observes the screen. The bezel is usually attached to the rest of the housing such that the cathode ray tube ("CRT") can be inserted into and affixed within the housing before the bezel is attached to conceal the unsightly edges of the front of the CRT. It is known in the art to construct both bezels which are attached to the housing before the CRT is inserted therein, and also bezels which are attached to the housing after the CRT is inserted therein. In the latter instance, frequently the front of the housing is the only opening big enough to insert the CRT through.

In the past, it has been the conventional practice to construct monitor housings from opaque materials such that it has been easy to conceal whatever attachment means is employed to attach the bezel to the housing. However, it has recently become popular to construct the housings of electronic devices, such as monitors, from colored transparent materials so that the working components of the devices are visible through the housing. While this is primarily an aesthetic improvement, it has a distinctly functional aspect. That is, in the effort to make monitors and the like, more aesthetically pleasing (and thus more marketable) it is important to retain mechanical integrity and strength in the product. Therefore, an improved method and apparatus for mounting a bezel which combines both aesthetic and functional aspects would be desirable.

To the inventor's knowledge, no method has existed in the prior art which effectively retains the aesthetic aspects of a clear monitor housing, while remaining mechanical strength sufficient to produce a reliable product. All methods which might have previously been used have either present an unsightly blemish visible through the front of the bezel, or else have been insufficiently strong, or else have been too expensive to employ, or some combination of these problems.

DISCLOSURE OF INVENTION

Accordingly, it is an object of the present invention to provide a bezel mounting apparatus which does not require a molded portion that can be seen through the face of a transparent bezel.

It is another object of the present invention to provide a bezel-mounting apparatus which securely mounts a bezel to the shell of a computer monitor housing.

It is yet another object of the present invention to provide a bezel mounting apparatus which is inexpensive produce.

It is still another object of the present invention to provide a bezel mounting apparatus which will effectively combine aesthetic and functional aspects.

It is yet another object of the present invention to provide a method for mounting a bezel to computer monitor housing which will securely mount the bezel without interfering with the aesthetics of the clear bezel front.

Briefly, an embodiment of the present invention is a computer monitor housing having a bezel with a plurality of attachment tabs located on the perimeter thereof, such that the edge of the attachment tabs are aligned with the a rim of the bezel, and therefore cannot be readily seen through the front of the bezel. A like plurality of intermediate attachment devices attach to the attachment tabs using post projections on the attachment devices which fit into and lock within receptor apertures in the attachment tabs. The attachment devices each have a screw receptor hole for receiving a screw which affixes the attachment device (with the bezel already affixed thereto) to the housing. The housing has a plurality of screw pass through apertures through, each of which will have one of the screws passed therethrough such that the attachment device will be affixed to the housing thereby when one of the screws is passed through this aperture and into the receptor hole of a corresponding attachment device.

An advantage of the present invention is that there is no molding on the back face of the bezel which can be readily seen through the bezel.

Another advantage of the present invention is that there is nothing in the way of a cosmetic interior covering in a bezel.

A further advantage of the present invention is that it is easy and inexpensive to implement.

Still another advantage of the present invention is that it securely attaches a bezel to a housing.

These and other objects and advantages of the present invention will become clear to those skilled in the art in view of the description of modes of carrying out the invention, and the industrial applicability thereof, as described herein and as illustrated in the several figures of the drawing. The objects and advantages listed are not an exhaustive list of all possible advantages of the invention. Moreover, it will be possible to practice the invention even where one or more of the intended objects and/or advantages might be absent or not required in the application.

Further, those skilled in the art will recognize that various embodiments of the present invention may achieve one or more, but not necessarily all, of the above described objects and advantages. Accordingly, the listed advantages are not essential elements of the present invention, and should not be construed as limitations.

BRIEF DESCRIPTION OF THE DRAWINGS

FIG. 5 is a side elevational view of the bezel of FIG. 1;

FIG. 6 is a side elevational view of the bezel attachment tab of FIG. 2;

FIG. 7 is a side elevational view of the attachment device of FIG. 2;

DETAILED DESCRIPTION OF THE INVENTION

Figure 1:
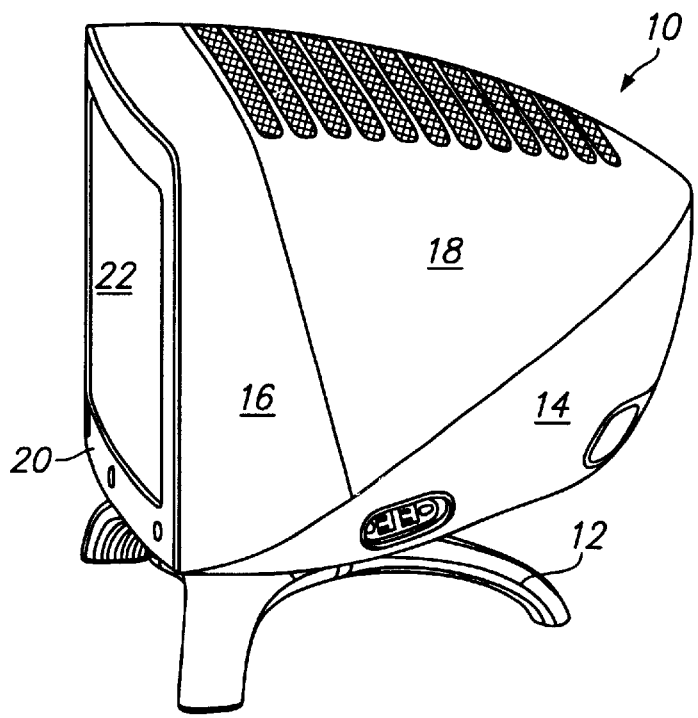
FIG. 1 is perspective view of an example of a computer case, according to the present invention.

The embodiments and variations of the invention described herein, and/or shown in the drawings, are presented by way of example only and are not limiting as to the scope of the invention. Unless otherwise specifically stated, individual aspects and components of the invention may be omitted or modified, or may have substituted therefore known equivalents, or as yet unknown substitutes such as may be developed in the future or such as may be found to be acceptable substitutes in the future. The invention may also be modified for a variety of applications while remaining within the spirit and scope of the claimed invention, since the range of potential applications is great, and since it is intended that the present invention be adaptable to many such variations.

A known mode for carrying out the invention is embodied in an improved computer case. The inventive computer case is depicted in a perspective view in FIG. 1 and is designated therein by the general reference character 10. The computer case 10 has a base 12, a tub 14, a case front 16, and a cover 18. The base 12, the tub 14, the case front 16 and the case cover 18 are generally conventional in nature, except as discussed hereinafter. One skilled in the art will recognize that the tub 14 provides a platform wherein many of the electronic components (not shown) of the monitor are to be mounted. The cover 18 is an easily removable part of the case 10 which provides access to the interior thereof, for service or the like, and the case front provides a place to mount a bezel 20 which surrounds a screen 22 at the front of the case 10.

Figure 2:
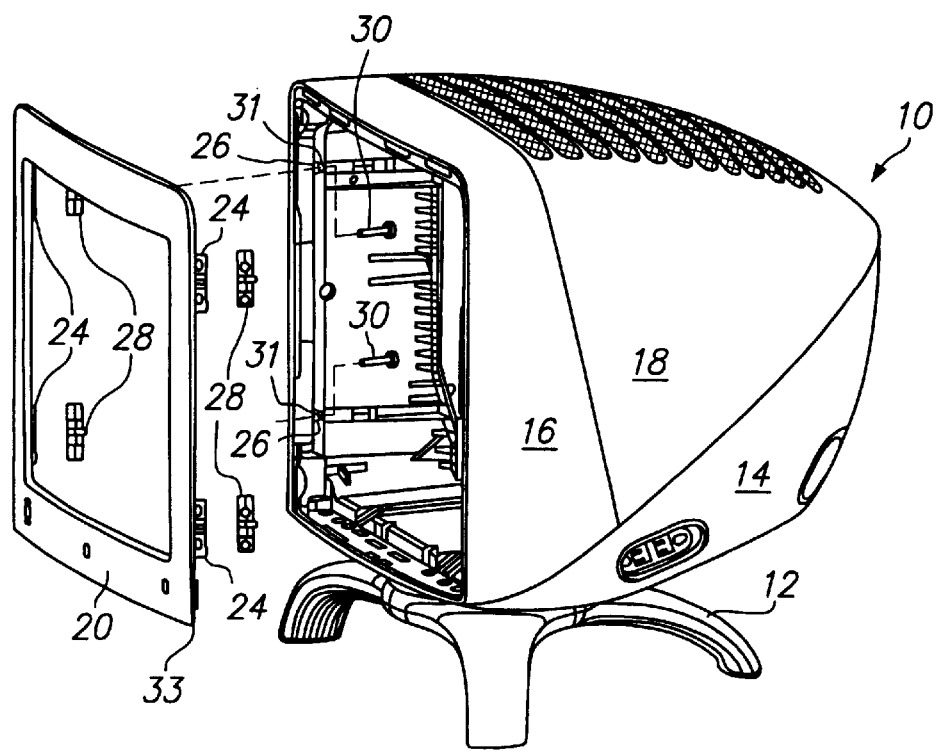
FIG. 2 is an exploded perspective view of the computer case of FIG. 1.

FIG. 2 is an exploded perspective view of the example of the computer case depicted in FIG. 1 (with the screen 22 tube, and other electronic components not installed therein). In the view of FIG. 2 it can be seen that the bezel 20 has a plurality (four in this present example, of which two can be seen in the view of FIG. 2) of bezel attachment tabs 24. A like plurality (of which two can be seen in the view of FIG. 2) of case attachment tabs 26 are provided on case front 16. For each bezel attachment tab 24, an attachment device 28 is provided which is affixed to the associated bezel attachment tab 24, as will be described in more detail hereinafter. In turn, each of the attachment devices 28 is affixed to the case attachment tab 26 by passing a screw 30 through a screw aperture 31 in each case attachment tab 26 and securing the screw 30 to the attachment device 28, as will also be described in more detail hereinafter. Accordingly, when the attachment device 28 is secured both to the bezel attachment tabs 24 and the case attachment tabs 26, then the bezel 20 is secured to the case front 16, as will be appreciated in light of the following discussion of the method and apparatus of such attachment, according to the present invention.

Figure 3:
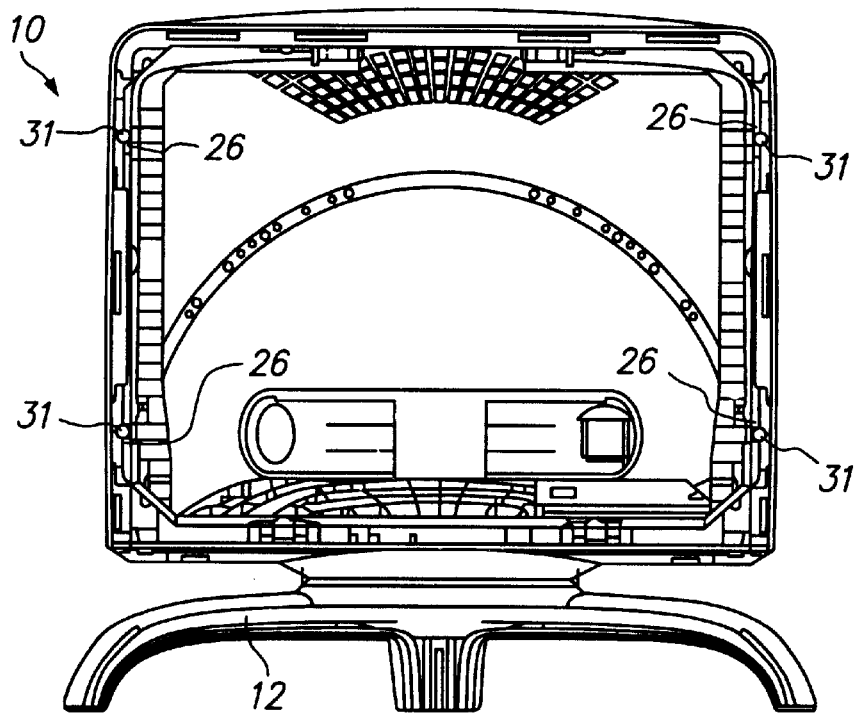
FIG. 3 is a front elevational view of the computer case of FIG. 1, with the bezel and screen removed therefrom.

FIG. 3 is a front elevational view of the computer case 10 of FIG. 1, with the bezel 20 and screen 22 removed therefrom. In the view of FIG. 3, it can be seen that the plurality of case attachment tabs 26, each having a screw aperture 31 therein, for accepting a screw 30 (FIG. 2) are placed about the interior of the case front 16.

Figure 4:
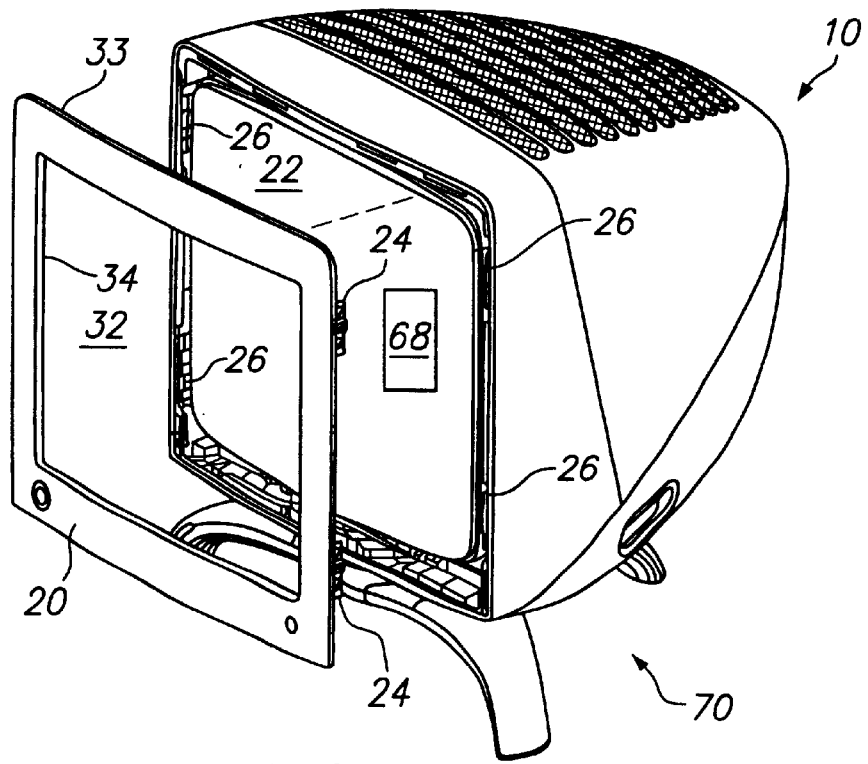
FIG. 4 is a perspective view of the bezel of FIG. 1.

FIG. 4 is a front perspective view of the bezel 20 of FIGS. 1 and 3. In the view of FIG. 4, a screen aperture 32 is provided wherethrough the screen 22 (FIG. 1) can be seen by the user. As can also be seen in the view of FIG. 4, the bezel 20 has the bezel attachment tabs 24 placed about a rim 33 (near the outer edge) thereof. Since the outer rim 33 is somewhat thicker than the rest of the bezel 20, and in this example is curved on the outer surface of the bezel (not visible in the view of FIG. 4), in order to provide a smooth transition between the bezel 20 and the case front 16 (FIG. 1), the user will generally be able to see the rim 33 from the front of the bezel 20 when the bezel is constructed of a transparent material. However, because the bezel attachment tabs 24 are aligned with the rim 33, the bezel attachment tabs 24 will generally not be visible to the user from the front of the bezel 20. At the least, the bezel attachment tabs 24 will not be very noticeable, even where they might be observable through the front of the bezel 20, because they are aligned with the outer rim 33. By way of contrast, it should be noted that any molding which might be on the back surface of the bezel 20, and which would not be concealed behind the outer rim 33, would be readily observable to the user through the front of the bezel 20 (and would, therefore, appear as a blemish or other undesirable visual interruption in the bezel) and/or would prevent any optional decorative interior from evenly covering the interior surface of the bezel. In the view of FIG. 4, an optional interior covering 34 is shown, which can be placed behind the bezel as an added decorative feature.

FIG. 5 is a side elevational view of the bezel of FIGS. 1, 2 and 4. In the view of FIG. 5, it can be seen that the bezel attachment tabs 26 project rearward from the rim 33 of the bezel 20. FIG. 6 is a side elevational view of one of the bezel attachment tabs 24, looking in toward the bezel 20 from outside the perimeter of the bezel 20. In the more detailed view of FIG. 6, it can be seen that the bezel attachment tab 24 has a rounded portion 35. The bezel attachment tab 24 also has two irregular apertures 36 in a generally rectangular attachment body 37, and each of the irregular apertures 36 has a large circular aperture 38 and an overlapping smaller aperture 40.

FIG. 7 is a side elevational view of the attachment device 28 of FIG. 2, from a perspective corresponding to that of the bezel attachment tabs 24 in FIG. 6. In the view of FIG. 7, it can be seen that the attachment device 28 has a generally rectangular attachment device body 41 with two (in this present example) projections 42. As can be seen in the view of FIG. 7, a first projection 42a has a rounded large portion 44a, and a second projection 42b has a flattened large portion 44b with a flat edge 46, the purpose of which will be discussed in more detail, hereinafter. Also visible in the view of FIG. 7 is a generally round screw acceptor 48 portion. In the view of FIG. 7 it can be seen that the screw acceptor 48 is located in a raised portion 50 of the attachment device body 41, which is provided to add strength to the attachment device 28.

Figure 8:
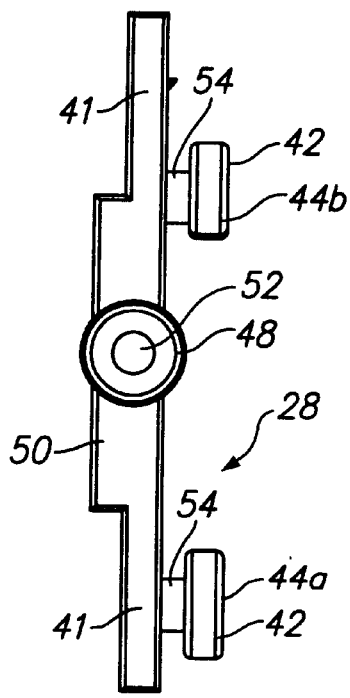
FIG. 8 is a rear plan view of the attachment device of FIG. 7.

FIG. 8 is a rear plan view of the attachment device of FIG. 7. In the view of FIG. 8 it can be seen that the screw acceptor 48 has a screw hole 52 therein, for accepting the self tapping screw 30 (FIG. 2). Also in the view of FIG. 8, it can be seen that the projections 42 each have a narrow portion 54, which will be discussed in more detail hereinafter.

The following discussion of the assembly of the bezel 20 to the case front 16 will refer to parts previously discussed in relation to FIGS. 2 through 8. In order to assemble the bezel 20 to the case front 16 (FIG. 2), each of the attachment devices 28 is affixed to its corresponding bezel attachment tab 24 by placing the projections 42 (FIG. 8) through the irregular apertures 36 (FIG. 6). The large circular apertures 38 of the irregular apertures 36 are sufficiently large to allow the large portions 44a and 44b to pass therethough. When the projections 42 are fully inserted into the irregular apertures 36, the attachment device(s) 28 can then be moved downwards such that the narrow portion 54 (FIG. 9) of the projections 42 fit snugly within the corresponding smaller circular apertures 40. Note that the flat edge 46 of the flattened large portion 44b of the second projection 42b on each attachment device 28 is provided so that the second projection 42b will not butt up against, and thus be prevented from moving by, the rounded portion 35 (FIG. 6) of the bezel attachment tab 24.

Figure 9:
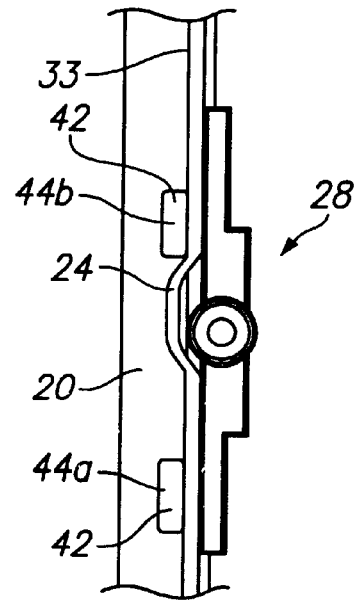
FIG. 9 is a rear plan view of a portion of the bezel of FIG. 2, showing an attachment device affixed thereto.

FIG. 9 is a detailed view of a portion of the bezel 20 showing one of the attachment devices attached to the corresponding bezel attachment tab 24. In the view of FIG. 9, it can be seen that the large portions 44a and 44b of the projections 42 are fully inserted through the bezel attachment tab 24 on the rim 33.

After each of the attachment devices 28 is attached to its corresponding bezel attachment tab 24, the bezel 20 is the affixed to the case front 16 (FIG. 2) by passing one of the screws 30 through the screw aperture 31 in the correspond case attachment tab 26 and securing the self tapping screw 30 into the screw hole 52 (FIG. 8) of the corresponding attachment device 28.

Figure 10:
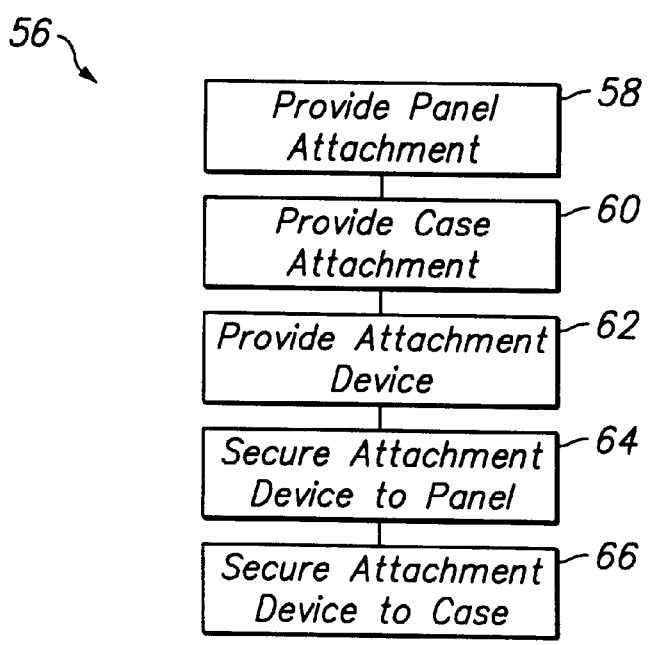
FIG. 10 is a flow diagram depicting some basic operations of the present inventive attachment method.

FIG. 10 is a flow diagram depicting some basic operations of the present inventive attachment method 56. As depicted in the view of FIG. 10, the attachment method 56 has a provide panel attachment operation 58, a provide case attachment operation 60, a provide attachment device operation 62, a secure attachment device to panel operation 64, and a secure attachment device to case operation 66. According to this example of the present inventive method 56, in the provide panel attachment operation 58, one or more attachment apparatus such as the bezel attachment tabs 24 (FIG. 2) are affixed to a panel to be attached, such as the bezel 20, in the example presented herein. As previously discussed, herein, the bezel attachment tabs 24 (or equivalent) are preferably aligned along a feature of the case (such as the outer rim 33, in the example given) which will generally prevent the bezel attachment tabs 24 from being seen through a transparent or semi-transparent pane (the bezel 20, in this example).

In the provide case attachment operation 60, apparatus is provided whereby the attachment device 28 can be attached to the case 10 (more particularly, to the case front 16, in the example given). In the example of FIGS. 1 through 9, such apparatus is the case attachment tabs 26, in conjunction with the screws 30. However, it is entirely within the scope of the invention that this, or any of the other attachment methods discussed herein, have substituted therefor some other attachment means. For example, one other attachment means which could be readily adapted to the purpose would be to provide a snap type receptor on the case 10, and a corresponding snap type projection on the attachment device 28.

In the provide attachment device operation 62, an attachment device such as the particularly described attachment device 28 is provided to be connected both to the case 10 and the panel (the bezel 20), thereby affixing the panel (the bezel 20) to the case 10 (via the case front 16 in this present example). While the attachment device 28 of this present example has been described in detail herein, one skilled in the art will recognize that any or all of the particular features of the attachment device 28 could be easily modified, to fit the needs of a particular application, or the like.

In the secure attachment device to panel operation 64, the attachment device 28 is affixed to the panel (the bezel 20) as has been discussed by way of example previously herein. In the secure attachment device to case operation the attachment device 28 is secured to the case 10, as has also been presented by way of example previously herein. It should be noted that particular applications might well require or suggest that the operations 64 and 66, and indeed any or all of the operations of the inventive method 56, be accomplished in some order other than that which has been discussed here by way of example.

Various modifications may be made to the invention without altering its value or scope. For example, it will be noted that the shape and quantity of components, as described herein in relation to the example of the invention her presented, are not a critical part of the invention. Indeed, it is anticipated that different applications, such as cases of different sizes, will require the modification of the invention in aspects such as quantity, size, and shapes of particular component aspects.

All of the above are only some of the examples of available embodiments of the present invention. Those skilled in the art will readily observe that numerous other modifications and alterations may be made without departing from the spirit and scope of the invention. Accordingly, the disclosure herein is not intended as limiting and the appended claims are to be interpreted as encompassing the entire scope of the invention.

Industrial Applicability

The inventive case 10, assembled according to the inventive method 56, and including inventive aspects such as the bezel attachment tabs 24, the case attachment tabs 26 and the attachment device 28 can be readily adapted to affix essentially any panels, or the like, to essentially any sort of case such as a computer CPU case, printer case, portable computer case, or the like. As discussed herein, the invention, and particularly the embodiment described by way of example herein, has be developed for affixing the bezel 20 to the monitor case 10 such that unsightly moldings will not mar the visual aesthetic aspect of the case 10 when the case 10 is made of transparent or semi-transparent materials. It is intended that the invention will be widely used in the construction of cases for electronic components, and the like, wherein the aesthetic aspect of the cases are an important part of the marketability, and thus of the practicality of producing, such components. Therefore, although the invention has been described herein in relation to an improved bezel mount method and apparatus, one skilled in the art will recognize that the described invention could readily be applied to essentially any part of the shell of essentially any type of appliance, component, or the like, wherein it is desired to have a rigid attachment means which does not require a molding that might be seen through the shell.

By way of example, it should be noted that the case (FIG. 4), with the addition of monitor electronics 68 (shown in block diagrammatic form in the view of FIG. 4) and a screen device such as a cathode ray tube, LCD display, or the like (the screen 22 of FIG. 1, in this present example) constitutes a complete computer monitor 70 (FIG. 4).

Since the improved bezel mount apparatus and method of the present invention may be readily produced, and since the advantages as described herein are provided, it is expected that they will be readily accepted in the industry. For these and other reasons, it is expected that the utility and industrial applicability of the invention will be both significant in scope and long-lasting in duration.

I claim:

1. An improved case housing, comprising:
   a case body;
   a screen bezel adapted for attachment to said case body; and
   an attachment device for attachment to said case body and further for attachment to said screen bezel; and
   wherein at least one of said case and said screen bezel has an attachment tab, the attachment tab being adapted for connection to said attachment device.
2. The case housing of claim 1, wherein:
   the case housing is a computer monitor case.
3. The case housing of claim 1, wherein: said attachment tab has an aperture adapted for accepting a projection on said attachment device.
4. The case housing of claim 1, wherein:
   said case housing is generally transparent.
5. The case housing of claim 1, wherein:
   said screen bezel has an attachment tab, the attachment tab being adapted for connection to said attachment device.
6. The case housing of claim 5, wherein:
   said attachment tab is aligned with a feature of said screen bezel.
7. The case housing of claim 6, wherein:
   the feature is a rim generally around at least a portion of a perimeter of said screen bezel.
8. The case housing of claim 5, wherien:
   said attachment tab has an aperture adapted for accepting a projection on said attachment device.
9. The case housing of claim 1, wherein:
   said case body has an attachment tab adapted for connection to said attachment device.
10. The case housing of claim 9, wherein:
    said attachment tab has a screw aperture for accepting a screw therethrough; and
    said attachment device has a screw acceptance hole for receiving the screw.
11. The case housing of claim 9, wherein:
    said screw is a self tapping screw.
12. The case housing of claim 1, wherein: a plurality of said attachment devices are positioned about said screen bezel.
13. The case housing of claim 12, wherein:
    the quantity of said attachment devices is four.
14. A computer monitor, comprising:
    a case;
    monitor electronics generally enclosed within said case;
    a display screen;
    a bezel generally surrounding at least a portion of said display screen; and
    an intermediate attachment device detachably affixed to said bezel and further detachably affixed to said case, for holding said bezel in place on said case.
15. The computer monitor of claim 14, wherein:
    a plurality of said attachment devices are placed generally around an outer rim of said bezel.
16. The computer monitor of claim 14, wherein:
    said bezel is at least partially transparent.
17. The computer monitor of claim 14, wherien:
    the attachment device has a projection adapted for fitting within an aperture on the bezel.
18. The computer monitor of claim 17, wherein:
    the aperture is on a tab projecting generally rearward from a rim of said bezel.
19. The computer monitor of claim 17, wherein:
    said attachment device further has a screw receptor for accepting a screw whereby said attachment device is affixed to said case.
20. The computer monitor of claim 14, wherein:
    said case includes a base, a tub portion, a case front portion, and a cover portion.
21. The case housing of claim 1, wherein said attachment device defines a screw hole oriented substantially perpendicular to a front surface of said panel.
22. The case housing of claim 12, wherein said attachment devices are not fixed to one another except through said case body and said panel.
23. The computer monitor of claim 14, wherein said intermediate attachment device defines a screw hole oriented substantially perpendicular to a front surface of said bezel.
24. The computer monitor of claim 14, wherein said attachment devices are not fixed to one another except through said case and said bezel.

* * * * *